United States Patent
Shi et al.

(10) Patent No.: US 11,300,444 B2
(45) Date of Patent: Apr. 12, 2022

(54) PHOTOELECTRIC DETECTION CIRCUIT AND PHOTOELECTRIC DETECTOR

(71) Applicant: BOE TECHNOLOGY GROUP CO., LTD., Beijing (CN)

(72) Inventors: Yongming Shi, Beijing (CN); Zhanjie Ma, Beijing (CN); Hui Tian, Beijing (CN); Chun Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 961 days.

(21) Appl. No.: 16/066,199

(22) PCT Filed: Dec. 18, 2017

(86) PCT No.: PCT/CN2017/116982
§ 371 (c)(1),
(2) Date: Jun. 26, 2018

(87) PCT Pub. No.: WO2018/223658
PCT Pub. Date: Dec. 13, 2018

(65) Prior Publication Data
US 2021/0199497 A1   Jul. 1, 2021

(30) Foreign Application Priority Data
Jun. 9, 2017 (CN) .......................... 201710434403.0

(51) Int. Cl.
*G01J 1/16* (2006.01)
*G01J 1/46* (2006.01)
(Continued)

(52) U.S. Cl.
CPC .............. *G01J 1/1626* (2013.01); *G01J 1/44* (2013.01); *G01J 1/46* (2013.01); *G01T 1/247* (2013.01); *G01T 1/241* (2013.01)

(58) Field of Classification Search
CPC ........... G01J 1/1626; G01J 1/46; G01T 1/247; G01T 1/241; G01T 1/24
See application file for complete search history.

(56) References Cited

U.S. PATENT DOCUMENTS

| 5,013,903 A | 5/1991 | Kasper |
| 6,781,468 B1 | 8/2004 | Robinson et al. |

(Continued)

FOREIGN PATENT DOCUMENTS

| CN | 1543060 A | 11/2004 |
| CN | 1324825 C | 7/2007 |

(Continued)

OTHER PUBLICATIONS

Chinese Office Action in Chinese Application No. 201710434403.0, dated Jan. 15, 2020 with English translation.
(Continued)

*Primary Examiner* — Christine S. Kim
(74) *Attorney, Agent, or Firm* — Collard & Roe, P.C.

(57) ABSTRACT

A photoelectric detection circuit and a photoelectric detector are provided. The photoelectric detection circuit includes a first photoelectric sensing element and a second photoelectric sensing element, and an electrical characteristic of the first photoelectric sensing element is substantially identical to an electrical characteristic of the second photoelectric sensing element; the first photoelectric sensing element outputs a first sensed electrical signal, and the second photoelectric sensing element outputs a second sensed electrical signal; a polarity of the first sensed electrical signal is opposite to a polarity of the second sensed electrical signal, and an amplitude value of the first sensed electrical signal is substantially identical to an amplitude value of the second sensed electrical signal.

17 Claims, 5 Drawing Sheets

(51) Int. Cl.
*G01T 1/24* (2006.01)
*G01J 1/44* (2006.01)

(56) References Cited

U.S. PATENT DOCUMENTS

| | | | |
|---|---|---|---|
| 6,885,249 | B2 | 4/2005 | Suzunaga |
| 9,621,279 | B2 | 4/2017 | Okamoto et al. |
| 2009/0020686 | A1 | 1/2009 | Sano |
| 2009/0039237 | A1 | 2/2009 | Inoue et al. |
| 2010/0054407 | A1* | 3/2010 | Endo .................... H04N 5/3742 378/62 |
| 2010/0133635 | A1* | 6/2010 | Lee ................... H01L 27/14623 257/433 |
| 2013/0090564 | A1 | 4/2013 | Tateishi et al. |
| 2016/0094798 | A1 | 3/2016 | Chappo |
| 2016/0293098 | A1* | 10/2016 | Liu ..................... H01L 27/3211 |
| 2017/0187939 | A1 | 6/2017 | Kasuga et al. |

FOREIGN PATENT DOCUMENTS

| | | | |
|---|---|---|---|
| CN | 101349821 A | 1/2009 | |
| CN | 102998008 A | 3/2013 | |
| CN | 103002799 A | 3/2013 | |
| CN | 202856739 U * | 4/2013 | |
| CN | 202856739 U | 4/2013 | |
| CN | 104218917 A | 12/2014 | |
| CN | 105075116 A | 11/2015 | |
| CN | 105209932 A | 12/2015 | |
| CN | 106525233 A | 3/2017 | |
| CN | 106716994 A | 5/2017 | |
| EP | 1 100 216 A2 | 5/2001 | |
| EP | 1100216 A2 * | 5/2001 | ............ H04B 10/11 |
| JP | 2930111 B2 | 8/1999 | |
| WO | 2007/102430 A1 | 9/2007 | |

OTHER PUBLICATIONS

Chinese Office Action in Chinese Application No. 201710434403.0, dated Aug. 1, 2019 with English translation.
International Search Report of PCT/CN2017/116982 in Chinese, dated Mar. 20, 2018 with English translation.
Notice of Transmittal of the International Search Report of PCT/CN2017/116982 in Chinese, dated Mar. 20, 2018.
Written Opinion of the International Searching Authority of PCT/CN2017/116982 in Chinese, dated Mar. 20, 2018 with English translation.

* cited by examiner

PHOTOELECTRIC DETECTION CIRCUIT AND PHOTOELECTRIC DETECTOR

CROSS REFERENCE TO RELATED APPLICATIONS

This application is the National Stage of PCT/CN2017/116982 filed on Dec. 18, 2017, which claims priority under 35 U.S.C. § 119 of Chinese Application No. 201710434403.0 filed on Jun. 9, 2017, the disclosure of which is incorporated by reference.

TECHNICAL FIELD

Embodiments of the present disclosure provide a photoelectric detection circuit and a photoelectric detector.

BACKGROUND

Photoelectric detection technology is a technique for detecting and recognizing objects according to light waves radiated or reflected by the detected objects, and has the advantages of high accuracy, high speed, long detection distance, large information capacity, strong anti-interference ability, non-contact detection, being easy to realize automation, intelligence, etc. According to the wavelength range of detection light, photoelectric detection technology can be divided into ultraviolet light detection technology, visible light detection technology, X-ray detection technology, infrared light detection technology, etc.

Photoelectric detection technology is widely used in various fields such as military, economics, medicine, environmental sciences, and so on. For example, X-ray detection technology can be applied to disease diagnosis, treatment, etc.; infrared light detection technology can be applied to infrared detection, night vision, infrared stealth, infrared guidance, infrared remote sensing, etc.; and visible light detection technology can be applied to monitoring, video doorbell, photometric measurement, etc.

SUMMARY

At least one embodiment of the present disclosure provides a photoelectric detection circuit, which comprises a first sub-circuit and a second sub-circuit. The first sub-circuit comprises a first photoelectric sensing element, and the second sub-circuit comprises a second photoelectric sensing element, and an electrical characteristic of the first photoelectric sensing element is substantially identical to an electrical characteristic of the second photoelectric sensing element, and the first sub-circuit is configured to receive a first set of power signals to enable the first photoelectric sensing element to output a first sensed electrical signal, and the second sub-circuit is configured to receive a second set of power signals to enable the second photoelectric sensing element to output a second sensed electrical signal, and a polarity of the first sensed electrical signal is opposite to a polarity of the second sensed electrical signal, and an amplitude value of the first sensed electrical signal is substantially identical to an amplitude value of the second sensed electrical signal.

For example, in the photoelectric detection circuit provided by at least one embodiment of the present disclosure, the first set of power signals comprises a first power voltage signal, and the second set of power signals comprises a second power voltage signal, and a first terminal of the first photoelectric sensing element is configured to receive the first power voltage signal, and a first terminal of the second photoelectric sensing element is configured to receive the second power voltage signal, and a polarity of the first terminal of the first photoelectric sensing element is opposite to a polarity of the first terminal of the second photoelectric sensing element.

For example, in the photoelectric detection circuit provided by at least one embodiment of the present disclosure, the first sub-circuit further comprises a first switching element and a first storage capacitor, and the first switching element is configured to control the first photoelectric sensing element to output the first sensed electrical signal, and the first storage capacitor is configured to store the first sensed electrical signal, and the second sub-circuit further comprises a second switching element and a second storage capacitor, and the second switching element is configured to control the second photoelectric sensing element to output the second sensed electrical signal, and the second storage capacitor is configured to store the second sensed electrical signal.

For example, in the photoelectric detection circuit provided by at least one embodiment of the present disclosure, the first set of power signals further comprises a third power voltage signal, and the second set of power signals further comprises a fourth power voltage signal, and a second terminal of the first photoelectric sensing element is electrically connected to a first terminal of the first switching element, and a control terminal of the first switching element is configured to receive a control signal, and a second terminal of the first switching element is electrically connected to a first terminal of the first storage capacitor, and a second terminal of the first storage capacitor is configured to receive the third power voltage signal; a second terminal of the second photoelectric sensing element is electrically connected to a first terminal of the second switching element, and a control terminal of the second switching element is configured to receive the control signal, and a second terminal of the second switch element is electrically connected to a first terminal of the second storage capacitor, and a second terminal of the second storage capacitor is configured to receive the fourth power voltage signal; and a polarity of the second terminal of the first photoelectric sensing element is opposite to a polarity of the second terminal of the second photoelectric sensing element.

For example, in the photoelectric detection circuit provided by at least one embodiment of the present disclosure, a difference obtained by subtracting the third power voltage signal from the first power voltage signal is a first voltage difference, and a difference obtained by subtracting the fourth power voltage signal from the second power voltage signal is a second voltage difference, and a sign of the first voltage difference is opposite to a sign of the second voltage difference, and an amplitude value of the first voltage difference is substantially equal to an amplitude value of the second voltage difference.

For example, in the photoelectric detection circuit provided by at least one embodiment of the present disclosure, the first terminal of the first photoelectric sensing element is a positive terminal, and the second terminal of the first photoelectric sensing element is a negative terminal, and the first terminal of the second photoelectric sensing element is a negative terminal, and the second terminal of the second photoelectric sensing element is a positive terminal.

For example, in the photoelectric detection circuit provided by at least one embodiment of the present disclosure, and an electrical characteristic of the first switching element is substantially identical to an electrical characteristic of the second switching element, and an electrical characteristic of the first storage capacitor is substantially identical to an electrical characteristic of the second storage capacitor.

For example, the photoelectric detection circuit provided by at least one embodiment of the present disclosure further comprises a difference circuit, the difference circuit is configured to perform a difference processing on a first output signal output by the first sub-circuit and a second output signal output by the second sub-circuit.

For example, the photoelectric detection circuit provided by at least one embodiment of the present disclosure further comprises an amplification circuit, the difference circuit is further configured to output a difference signal, and the amplification circuit receives the difference signal and performs an amplification process on the difference signal.

For example, in the photoelectric detection circuit provided by at least one embodiment of the present disclosure, the first photoelectric sensing element comprises a photodiode and the second photoelectric sensing element comprises a photodiode.

For example, the photoelectric detection circuit provided by at least one embodiment of the present disclosure further comprises a wavelength conversion element, the first photoelectric sensing element and the second photoelectric sensing element have a same response wavelength range, and the wavelength conversion element is configured to convert incident light into light in the response wavelength range.

At least one embodiment of the present disclosure also provides a photoelectric detector comprising at least one photoelectric detection circuit as described in any of the above embodiments.

For example, the photoelectric detector provided by at least one embodiment of the present disclosure further comprises a base substrate, the first sub-circuit and the second sub-circuit are provided on the base substrate, and an orthographic projection of the first sub-circuit on the base substrate does not substantially overlap with an orthographic projection of the second sub-circuit on the base substrate.

For example, the photoelectric detector provided by at least one embodiment of the present disclosure further comprises a base substrate, the first sub-circuit and the second sub-circuit are provided on the base substrate, and an orthographic projection of the first sub-circuit on the base substrate overlaps with at least part of an orthographic projection of the second sub-circuit on the base substrate.

For example, in the photoelectric detector provided by at least one embodiment of the present disclosure, the first sub-circuit further comprises a first switching element and a first storage capacitor, and the second sub-circuit further comprises a second switching element and a second storage capacitor; an orthogonal projection of the first switching element on the base substrate overlaps with an orthogonal projection of the second switching element on the base substrate, and/or, an orthogonal projection of the first storage capacitor on the base substrate overlaps with an orthogonal projection of the second storage capacitor on the base substrate.

For example, the photoelectric detector provided by at least one embodiment of the present disclosure further comprises a first power terminal and a second power terminal, the first set of power signals comprises a first power voltage signal, and the second set of power signals comprises a second power voltage signal, and the first power terminal is configured to output the first power voltage signal to a first terminal of the first photoelectric sensing element, and the second power terminal is configured to output the second power voltage signal to a first terminal of the second photoelectric sensing element, and a polarity of the first terminal of the first photoelectric sensing element is opposite to a polarity of the first terminal of the second photoelectric sensing element.

For example, the photoelectric detector provided by at least one embodiment of the present disclosure further comprises a third power terminal and a fourth power terminal, the first sub-circuit further comprises a first switching element and a first storage capacitor, and the second sub-circuit further comprises a second switching element and a second storage capacitor, and the first set of power signals further comprises a third power voltage signal, and the second set of power signals further comprises a fourth power voltage signal, and the third power terminal is configured to output the third power voltage signal, and the fourth power terminal is configured to output the fourth power voltage signal, and a second terminal of the first photoelectric sensing element is electrically connected to a first terminal of the first switching element, and a control terminal of the first switching element is configured to receive a control signal, and a second terminal of the first switch element is electrically connected to a first terminal of the first storage capacitor, and a second terminal of the first storage capacitor is configured to receive the third power voltage signal; and a second terminal of the second photoelectric sensing element is electrically connected to a first terminal of the second switching element, and a control terminal of the second switching element is configured to receive the control signal, and a second terminal of the second switch element is electrically connected to a first terminal of the second storage capacitor, and a second terminal of the second storage capacitor is configured to receive the fourth power voltage signal, and a polarity of the second terminal of the first photoelectric sensing element is opposite to a polarity of the second terminal of the second photoelectric sensing element.

For example, in the photoelectric detector provided by at least one embodiment of the present disclosure, a difference obtained by subtracting the third power voltage signal from the first power voltage signal is a first voltage difference, and a difference obtained by subtracting the fourth power voltage signal from the second power voltage signal is a second voltage difference, and a sign of the first voltage difference is opposite to a sign of the second voltage difference, and an amplitude value of the first voltage difference is substantially equal to an amplitude value of the second voltage difference.

For example, in the photoelectric detector provided by at least one embodiment of the present disclosure, the first terminal of the first photoelectric sensing element is a positive terminal, and the second terminal of the first photoelectric sensing element is a negative terminal, and the first terminal of the second photoelectric sensing element is a negative terminal, and the second terminal of the second photoelectric sensing element is a positive terminal.

For example, the photoelectric detector provided by at least one embodiment of the present disclosure further comprises a passivation layer, and the passivation layer is on the first sub-circuit and the second sub-circuit.

At least one embodiment of the present disclosure provides a photoelectric detection circuit and a photoelectric detector, and the photoelectric detector circuit adds a second sub-circuit, and the polarity of the sensed electrical signal output by the second photoelectric sensing element of the second sub-circuit is opposite to the polarity of the sensed electrical signal output by the first photoelectric sensing element of the first sub-circuit. By performing the difference processing on the output signal of the first sub-circuit and the output signal of the second sub-circuit, the noise caused by the external environment in the photoelectric detection circuit is eliminated on the basis of not reducing the signal intensity, and the signal-to-noise ratio is increased, and the detection accuracy is improved.

BRIEF DESCRIPTION OF THE DRAWINGS

In order to clearly illustrate the technical solution of the embodiments of the present disclosure, the embodiments or the drawings of the related technical description will be briefly described in the following, it is obvious that the described drawings are only related to some embodiments of the present disclosure and thus are not limitative of the present disclosure.

DETAILED DESCRIPTION

Figure 1A:
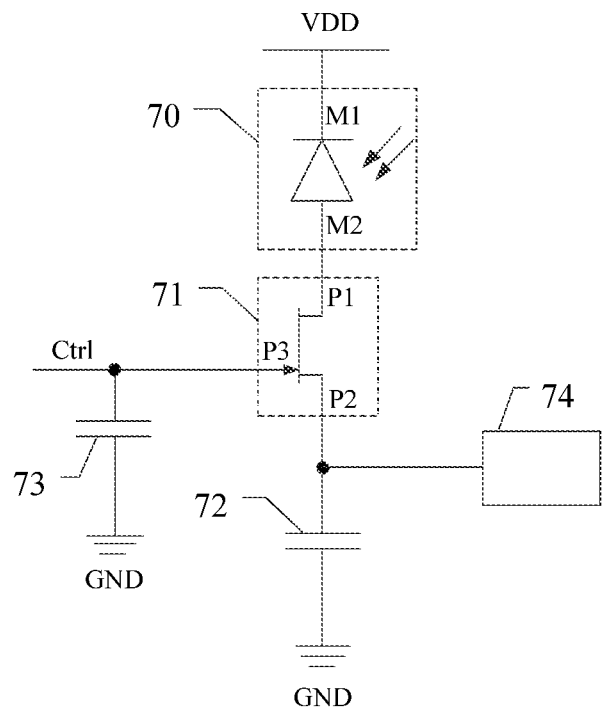
FIG. 1A is a schematic structural diagram of a passive photoelectric detection circuit.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "On," "under," "right," "left" and the like are only used to indicate relative position relationship, and when the position of the object which is described is changed, the relative position relationship can be changed accordingly.

In order to keep the following description of the embodiments of the present disclosure clear and concise, detailed descriptions of known functions and known components are omitted in the present disclosure.

With the development of science and technology, photoelectric detection technology has become more and more widely used in the medicine, agriculture, electronics, aerospace technology and other fields. For example, X-ray detection technology can convert invisible X-rays to visible light, and then the visible light is received by photodiodes and converted into an electrical signal, which is easily measured, by the photovoltaic effect, thereby implementing a detection function. In the medical field, X-ray detection technology can be applied to computerized tomography to examine a variety of diseases.

An X-ray detector is a photoelectric detector using an amorphous silicon photodiode array as its core. The X-ray detector comprises an array substrate comprising an X-ray conversion layer and a detection array composed of a plurality of detection units, and each of detection units comprises a thin film transistor (TFT, Thin Film Transistor) and a photodiode, for example. When X-rays are incident on the array substrate, the X-ray conversion layer converts the X-rays into visible light, and then the visible light is converted into electrical signals by the photodiode and stored, and then thin film transistors are turned on row by row under the control of a driving circuit, and the electronic charges converted by the photodiode is transmitted to a data processing circuit through the thin film transistor, and the data processing circuit conducts further processes on the charge signal for amplification, analog-to-digital conversion, etc., and the detection image information is obtained finally.

The detection circuit of the X-ray detector can comprise two types, i.e., active type and passive type. A passive photoelectric detection circuit directly outputs and detects the photoelectric signal generated by a photoelectric sensing element; and an active photoelectric detection circuit amplifies the photoelectric signal generated by a photoelectric sensing element firstly, and then outputs and detects the amplified photoelectric signal.

FIG. 1A shows a schematic structure diagram of a passive photoelectric detector circuit. For example, as shown in FIG. 1A, the detection circuit comprises a photodiode 70, a transistor 71, a charge storage capacitor 72, a gate storage capacitor 73, and a charge amplifier 74. The photodiode 70 is used to convert an optical signal into an electrical signal, and the transistor 71 is used to control transferring of the electrical signal generated by the photodiode 70 to the charge storage capacitor 72, and the charge storage capacitor 72 is used to store the electrical signal generated by the photodiode 70, and the gate storage capacitor 73 is used to maintain the voltage signal of a control terminal P3 of the transistor 71.

For example, a power voltage terminal VDD outputs a positive voltage, a first terminal M1 of the photodiode 70 is electrically connected to the power voltage terminal VDD, and a second terminal M2 of the photodiode is electrically connected to a first terminal P1 of the transistor 71; the control terminal P3 of the transistor 71 is electrically connected to a first terminal of the gate storage capacitor 73 and is configured to receive a control signal, and a second terminal P2 of the transistor 71 is electrically connected to a first terminal of the charge storage capacitor 72; a second terminal of the charge storage capacitor 72 can be electrically connected to the ground GND, and a second terminal of the gate storage capacitor 73 can also be electrically connected to the ground GND.

When the photoelectric detector operates, the photodiode 70 is irradiated by light and generates optical-generated charges corresponding to the intensity of the light signal, which can be directionally moved under the control of the voltage between the power voltage terminal VDD and the ground GND. When the control terminal P3 of the transistor 71 receives a turn-on signal Ctrl, the transistor 71 is turned on, so the optical-generated charges can be transmitted by the transistor 71 to the charge storage capacitor 72, and stored by the charge storage capacitor 72, and then transmitted to the charge amplifier 74 for further processing, and detected, and an image information can be formed finally.

Figure 1B:
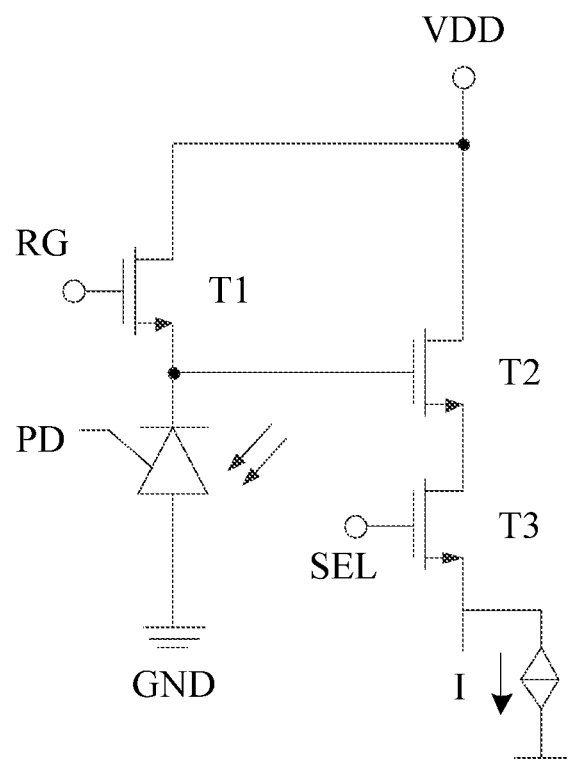
FIG. 1B is a schematic structural diagram of an active photoelectric detection circuit.

FIG. 1B shows a schematic structure diagram of an active photoelectric detection circuit. For example, as shown in FIG. 1B, the active photoelectric detection circuit comprises a photodiode PD, a reset transistor T1, a source follower transistor T2, and a selection transistor T3. The optical-generated charges generated and collected by the photodiode PD is sensed under the control of the three MOS transistors. The specific detection process of the active photoelectric detection circuit can comprise: in a reset stage, a control terminal of the reset transistor T1 receives a reset signal RG, and the reset transistor T1 is turned on and the photodiode PD is reset instantaneously; in an optical sensing accumulation stage, the reset signal RG is turned off, and the reset transistor T1 is turned off, and the photodiode PD responds to the incident light to generate an electron-hole pair (EHP) when light is incident on the photodiode PD. In a signal amplification stage, the charge accumulated (or stored) in the photodiode PD is transmitted to the source follower transistor T2, and the source follower transistor T2 amplifies the photoelectric signal output by the photodiode PD. In an output stage, a control terminal of the selection transistor T3 receives a selection enable signal SEL, so that the selection transistor T3 is turned on, and an amplified photoelectric signal I is output, and then the amplified photoelectric signal I is further processed such as amplification, analog/digital conversion, and the like, and detected, and the image information is formed finally.

The characteristic curve of each electronic component of the photoelectric detection circuit changes with the change of the external environment. For example, the threshold voltage of the thin film transistor drifts with the change of the external environment; the output level of the storage capacitor may drift with the change of the external environment. Therefore, the photoelectric detector circuit generates noise signals due to the changes of the external environment. As shown in FIG. 1A, the noise signal and the optical-generated charge generated by the photodiode 70 are output simultaneously, resulting in a difference between the signal actually output by the photoelectric detection circuit and the optical-generated charges generated by the photodiode 70.

Because the external environment changes with time, the output signal of the photoelectric detection circuit comprises optical-generated charges generated by the photodiode 70 and the noise signal changed with the environment, that is, the amount of the charges Q stored in the charge storage capacitor 72 can be expressed by the following equation:

$$Q=f1+f2$$

where f1 is a function of the amount of the charges generated by the photodiode 70 with respect to light, that is, f1 involves optical-generated charges that need to be detected; f2 is a function of the amount of the charges with respect to the external environment, and f2 represents the environmental noise signal generated by the electronic component(s) in the circuit structure due to the change in the external environment, and the environmental noise signal is independent of the optical-generated charges that need to be detected. Due to the existence of the environmental noise signal, there is a difference between the detected output charge signal and the optical-generated charge signal actually generated by the photodiode 70, which affects the detection accuracy and even causes detection error or errors.

At least one embodiment of the present disclosure provides a photoelectric detection circuit and a photoelectric detector. The photoelectric detection circuit comprises a first sub-circuit and a second sub-circuit, and the first sub-circuit comprises a first photoelectric sensing element, the second sub-circuit comprises a second photoelectric sensing element, and an electrical characteristic of the first photoelectric sensing element is substantially identical to an electrical characteristic of the second photoelectric sensing element, and the first sub-circuit is configured to receive a first set of power signals to enable the first photoelectric sensing element to output a first sensed electrical signal, and the second sub-circuit is configured to receive a second set of power signals to enable the second photoelectric sensing element to output a second sensed electrical signal, and a polarity of the first sensed electrical signal is opposite to a polarity of the second sensed electrical signal, and an amplitude value of the first sensed electrical signal is substantially identical to an amplitude value of the second sensed electrical signal. Thus, the photoelectric detection circuit adds the second sub-circuit, and the polarity of the sensed electrical signal output by the second photoelectric sensing element of the second sub-circuit is opposite to the polarity of the sensed electrical signal output by the first photoelectric sensing element of the first sub-circuit, and therefore, by performing a difference processing on the output signal of the first sub-circuit and the output signal of the second sub-circuit, the noise caused by the external environment of the photoelectric detection circuit is eliminated on the basis of not reducing signal intensity, and the signal-to-noise ratio is increased, and the detection accuracy is improved.

In the following, a passive photoelectric detection circuit taken as an example is described in the embodiment of the present disclosure, and those skilled in the art should understand that the photoelectric detection circuit provided by the present disclosure can also be an active photoelectric detection circuit, and the implementation of the present disclosure is not limited thereto.

In the following description of the present disclosure, the phrase "electrical characteristics are substantially identical" indicates that electrical characteristics of the electronic component of the same type are the same or substantially the same in the same external environment. For example, in the same external environment, the electronic components of the same type have substantially the same environmental noise. For example, when the material, bulk, size, manufacturing process conditions, and the like of the electronic components of the same type are the same, the electronic components of the same type have substantially the same electrical characteristics in the same external environment. Similarly, the phrase "amplitude values are substantially identical" means that two amplitude values are equal or substantially equal, and if there is a difference between the two amplitude values, the difference with respect to the larger one is no more than 10%, preferably no more than 5%.

Several embodiments of the present disclosure will be described in detail below, but the present disclosure is not limited to these specific embodiments.

Figure 2:
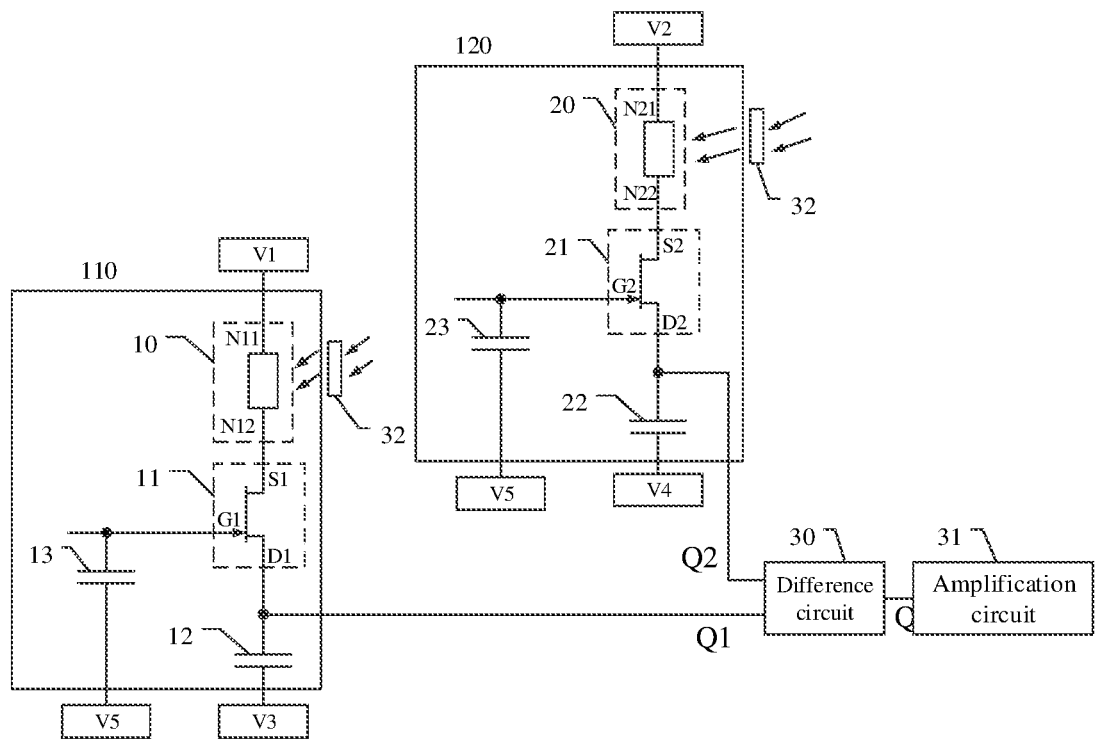
FIG. 2 is a schematic structural diagram of a photoelectric detection circuit provided by an embodiment of the present disclosure.

An embodiment of the present disclosure provides a photoelectric detection circuit. FIG. 2 shows a schematic structure diagram of the photoelectric detection circuit provided by an embodiment of the present disclosure.

For example, as shown in FIG. 2, the photoelectric detection circuit comprises a first sub-circuit 110 and a second sub-circuit 120. The first sub-circuit 110 comprises a first photoelectric sensing element 10, and the second sub-circuit 120 comprises a second photoelectric sensing element 20, and an electrical characteristic of the first photoelectric sensing element 10 is substantially identical to an electrical characteristic of the second photoelectric sensing element 20, and the first sub-circuit 110 is configured to receive a first set of power signals to enable the first photoelectric sensing element 10 to output a first sensed electrical signal, and the second sub-circuit 120 is configured to receive a second set of power signals to enable the second photoelectric sensing element 20 to output a second sensed electrical signal, and a polarity of the first sensed electrical signal is opposite to a polarity of the second sensed electrical signal, and an amplitude value of the first sensed electrical signal is substantially identical to an amplitude value of the second sensed electrical signal.

For example, a photoelectric detection circuit provided by an embodiment of the present disclosure can comprise one first sub-circuit and a plurality of second sub-circuits, that is, one first sub-circuit can correspond to the plurality of second sub-circuits. For another example, a plurality of photoelectric detection circuits can be arranged in an array, and each of photoelectric detection circuits comprises a first sub-circuit, and at least two photoelectric circuits comprise a second sub-circuit, that is, at least two first sub-circuits correspond to one second sub-circuit, so that the area occupied by the second sub-circuit in the array formed by the photoelectric detection circuits can be reduced.

For example, the first photoelectric sensing element 10 is used to respond to incident light to generate electron-hole pairs, thereby obtaining a first optical charge signal; the second photoelectric sensing element 20 is also used to respond to the incident light to generate electron-hole pairs, thereby obtaining a second optical charge signal. It should be noted that the first optical charge signal only represents the charge signal generated by the first photoelectric sensing element 10 due to illumination, and the first optical charge signal can comprise the total number of electrons and holes generated by the first photoelectric sensing element 10, and the second optical charge signal only represents the charge signal generated by the second photoelectric sensing element 20 due to the illumination, and the second optical charge signal can comprise the total number of electrons and holes generated by the second photoelectric sensing element 10.

For example, because the electrical characteristic of the photoelectric sensing element 10 is substantially identical to the electrical characteristic of the photoelectric sensing element 20, the number of electron-hole pairs generated by the first photoelectric sensing element 10 and the second photoelectric sensing element 20 are the same under the same incident light irradiation; that is, the number of the first optical charge signals is identical to the number of the second optical charge signals. The description of "the same incident light" can mean, for example, that the intensity, wavelength, and the like of incident light are all the same or substantially the same.

For example, the first set of power signals comprises a first power voltage signal, and the second set of power signals comprises a second power voltage signal. A first terminal N11 of the first photoelectric sensing element 10 is configured to receive the first power voltage signal, and a first terminal N21 of the second photoelectric sensing element 20 is configured to receive the second power voltage signal.

For example, the electrical connection manner of the first photoelectric sensing element 10 is opposite to the electrical connection manner of the second photoelectric sensing element 20 to ensure that the polarity of the first sensed electrical signal output by the first photoelectric sensing element 10 is opposite to the polarity of the second sensed electrical signal output by the second photoelectric sensing element 20. For example, the first sensed electrical signal is a positive signal, and correspondingly, the second sensed electrical signal is a negative signal.

It should be noted that the phase "the electrical connection manner of the first photoelectric sensing element 10 is opposite to the electrical connection manner of the second photoelectric sensing element 20" can mean that the flow direction of the signals in the first sub-circuit 110 is opposite to the flow direction of the signals in the second sub-circuit 120. That is, the polarity of the first terminal N11 of the first photoelectric sensing element is opposite to the polarity of the first terminal N21 of the second photoelectric sensing element. For example, if the first terminal N11 of the first photoelectric sensing element 10 is a positive terminal, the first terminal N21 of the second photoelectric sensing element 20 is a negative terminal.

For example, the first sensed electrical signal corresponds to the first optical charge signal, and the second sensed electrical signal corresponds to the second optical charge signal. That is, if the first sensed electrical signal is a positive signal, the second sensed electrical signal is a negative signal, and the first sensed electrical signal represents the number of holes in the first optical charge signal, and the second sensed electrical signal represents the number of electrons in the second optical charge signal.

For example, the first photoelectric sensing element 10 can be the same as the second photoelectric sensing element 20, but it is not required that both are exactly the same. For example, both can be substantially the same. For example, the first photoelectric sensing element 10 and the second photoelectric sensing element 20 can use the same material and can be formed on substantially the same manufacturing process conditions; also, both also have the same size and so on. It should be noted that there can also be some differences between the first photoelectric sensing element 10 and the second photoelectric sensing element 20, as long as it is ensured that the electrical characteristic of the first photoelectric sensing element 10 is substantially identical to the electrical characteristic of the second photoelectric sensing element 20 in the same external environment. For example, in the same external environment, the first photoelectric sensing element 10 and the second photoelectric sensing element 20 have substantially the same environmental noise (e.g., thermal noise, temperature drift, etc.).

For example, the external environment can comprise temperature, humidity, air pressure, electromagnetic environment, and the like.

For example, the first photoelectric sensing element 10 can comprise a photodiode, and the second photoelectric sensing element 20 may also comprises a photodiode. The photodiode may comprise, for example, a PN junction photodiode, a PIN junction photodiode, an avalanche photodiode, a Schottky type photodiode, and the like. The manufacturing materials of the photodiode may comprise amorphous silicon (a-Si), germanium (Ge), gallium arsenide (GaInAs), cadmium sulfide (Cds), cadmium selenide (CdSe), cadmium telluride (CdTe), lead sulfide (PbS), and mercury cadmium telluride (HgCdTe) and other photoelectric conversion materials.

It should be noted that the type of the first photoelectric sensing element 10 and the type of the second photoelectric sensing element 20 are not limited to photodiodes, and can also be other suitable devices. For example, the other suitable devices can be photovoltaic detectors such as electrical contact photodiodes of metal-oxide-metal structures, photoelectric transistors, and so on.

For example, the first sub-circuit 110 further comprises a first switching element 11 and a first storage capacitor 12, and the second sub-circuit 120 also comprises a second switching element 21 and a second storage capacitor 22. The first switching element 11 is configured to control the first photoelectric sensing element 10 to output the first sensed electrical signal, and the first storage capacitor 12 is configured to store the first sensed electrical signal. The second switching element 21 is configured to control the second photoelectric sensing element 20 to output the second sensed electrical signal, and the second storage capacitor 22 is configured to store the second sensed electrical signal.

For example, the first set of power signals further comprises a third power voltage signal, and the second set of power signals further comprises a fourth power voltage signal.

For example, as shown in FIG. 2, a second terminal N12 of the first photoelectric sensing element 10 is electrically connected to a first terminal 51 of the first switch element 11, and a control terminal G1 of the first switch element 11 is configured to receive a first control signal, and a second terminal D1 of the first switch element 11 is electrically connected to a first terminal of the first storage capacitor 12, and a second terminal of the first storage capacitor 12 is configured to receive the third power voltage signal.

A second terminal N22 of the second photoelectric sensing element 20 is electrically connected to a first terminal S2 of the second switching element 21, and a control terminal G2 of the second switching element 21 is configured to receive a second control signal, and a second terminal D2 of the second switch element 21 is electrically connected to a first terminal of the second storage capacitor 22, and a second terminal of the second storage capacitor 22 is configured to receive the fourth power voltage signal.

For example, the polarity of the second terminal N12 of the first photoelectric sensing element 10 is opposite to the polarity of the second terminal N22 of the second photoelectric sensing element 20.

For example, a difference obtained by subtracting the third power voltage signal from the first power voltage signal is a first voltage difference, and a difference obtained by subtracting the fourth power voltage signal from the second power voltage signal is a second voltage difference, and a sign of the first voltage difference is opposite to a sign of the second voltage difference, and an amplitude value of the first voltage difference is substantially identical to an amplitude value of the second voltage difference.

For example, in one example, the first terminal N11 of the first photoelectric sensing element 10 is a positive terminal, and the second terminal N12 of the first photoelectric sensing element 10 is a negative terminal, and the first terminal N21 of the second photoelectric sensing element 20 is a negative terminal, and the second terminal N22 of the second photoelectric sensing element 20 is a positive terminal.

It should be noted that in the embodiments of the present disclosure, the "positive terminal" means that the power voltage signal received by the positive terminal is greater than the power voltage signal received by the "negative terminal". The "positive terminal" and the "negative terminal" are not directly related to the actual positive and negative values of the first power voltage signal, the second power voltage signal, the third power voltage signal, and the fourth power voltage signal.

When the first terminal N11 of the first photoelectric sensing element 10 is a positive terminal, and the second terminal N12 of the first photoelectric sensing element 10 is a negative terminal, and the first terminal N21 of the second photoelectric sensing element 20 is a negative terminal, and the second terminal N22 of the second photoelectric sensing element 20 is a positive terminal, the first power voltage signal, the second power voltage signal, the third power voltage signal, and the fourth power voltage signal can all be positive voltage signals. For example, the first power voltage signal is 5V, the second power voltage signal is 1V, the third power voltage signal is 1V, and the fourth power voltage signal is 5V. the first power voltage signal, the second power voltage signal, the third power voltage signal, and the fourth power voltage signal can also all be negative voltage signals. For example, the first power voltage signal is −1V, the second power voltage signal is −5V, the third power voltage signal is −5V, and the fourth power voltage signal is −1V. One of the first power voltage signal and the second power voltage signal is a positive voltage signal, and the other is a negative voltage signal, and one of the third power voltage signal and the fourth power voltage signal is a positive voltage signal, and the other is a negative voltage signal. For example, the first power voltage signal is 3V, the second power voltage signal is −3V, the third power voltage signal is −3V, and the fourth power voltage signal is 3V. It should be noted that the third power voltage signal and the fourth power voltage signal can also be the same. For example, the first power voltage signal is 3V, the second power voltage signal is −3V, and the third power voltage signal and the fourth power voltage signal are both 0V; or the first power voltage signal is 5V, the second power voltage signal is 1V, and the third power voltage signal and the fourth power voltage signal are both 3V.

It should be noted that the specific amplitude values of the first power voltage signal, the second power voltage signal, the third power voltage signal, and the fourth power voltage signal can be set according to actual conditions as long as it is ensured that the sign of the first voltage difference is opposite to the sign of the second voltage difference, and the amplitude value of the first voltage difference is substantially identical to the amplitude value of the second voltage difference, and the embodiment of the present disclosure does not limit in this aspect.

For example, when the first terminal N11 of the first photoelectric sensing element 10 is a positive terminal, and the second terminal N12 of the first photoelectric sensing element 10 is a negative terminal, and the first terminal N21 of the second photoelectric sensing element 20 is a negative terminal, and the second terminal N22 of the second photoelectric sensing element 20 is a positive terminal, the first power voltage signal is greater than the third power voltage signal, so the first sensed electrical signal output by the first photoelectric sensing element 10 to the first storage capacitor 12 is a positive signal; the second power voltage signal is smaller than the fourth power voltage signal, so the second sensed electrical signal output by the second photoelectric sensing element 20 to the second storage capacitor 22 is a negative signal.

For another example, the first terminal N11 of the first photoelectric sensing element 10 can also be a negative terminal, and the second terminal N12 of the first photoelectric sensing element 10 can also be a positive terminal, and the first terminal N21 of the second photoelectric sensing element 20 can also be a positive terminal, and the second terminal N22 of the second photoelectric sensing element 20 can also be a negative terminal.

For example, the first storage capacitor 12 can also store noise signals generated by each of the electronic components in the first sub-circuit 110 due to the external environment; the second storage capacitor 22 can also store noise signals generated by each of the electronic components in the second sub-circuit 120 due to the external environment.

For example, the electrical characteristic of the first switching element 11 is substantially identical to the electrical characteristic of the second switching element 21, and the electrical characteristic of the first storage capacitor 12 is substantially identical to the electrical characteristic of the second storage capacitor 22. For example, the electrical characteristic of the first switching element 11 and the electrical characteristic of the second switching element 21 can comprise temperature drift, dissipated power, frequency characteristics, maximum reverse voltage, threshold voltage, reverse current, and the like; the electrical characteristic of the first storage capacitor 12 and the electrical characteristic of the second storage capacitor 22 can comprise dielectric loss, temperature drift, nominal capacitance, rated operating voltage, insulation resistance between the two electrodes, and the like.

For example, the first storage capacitor 12 and the second storage capacitor 22 can be fixed capacitors, variable capacitors or trim capacitors. For example, an aluminum electrolytic capacitor, a tantalum electrolytic capacitor, a polyester film capacitor, a ceramic capacitor, a polystyrene capacitor, or the like can be used.

For example, the first switching element 11 and the second switching element 21 can be transistors such as MOS transistors or thin film transistors (TFTs). The thin film transistor can comprise, for example, an oxide thin film transistor, an amorphous silicon thin film transistor, a polysilicon thin film transistor, or the like. For example, in order to better ensure that the electrical characteristic of the first switching element 11 is substantially identical to the electrical characteristic of the second switching element 21, the first switching element 11 and the second switching element 21 can be provided adjacent to each other and use different portions of the same active layer, respectively.

For example, the first switching element 11 and the second switching element 21 may be N-type transistors, and may also be P-type transistors. For different types of transistors, the level of the control voltage of the control terminal of the transistor needs to be adjusted accordingly. For example, for an N-type transistor, the N-type transistor is in a turn-on state when the control signal is at a high level, and the N-type transistor is in a turn-off state when the control signal is at a low level. For example, for a P-type transistor, the P-type transistor is in a turn-on state when the control voltage is at a low level, and the P-type transistor is in a turn-off state when the control signal is at a high level.

For example, in one example, the first switching element 11 and the second switching element 21 may be prepared by using a low-temperature polysilicon process so that the thin film transistor has higher charge mobility and a smaller volume.

It should be noted that the first switching element 11 and the second switching element 21 may be the same, or there may be a certain difference, as long as it is ensured that the electrical characteristic of the first switching element is substantially identical to the electrical characteristic of the second switching element in the same external environment. Similarly, the first storage capacitor 12 and the second storage capacitor 22 may be the same, or there may be a certain difference, as long as it is ensured that the electrical characteristic of the first storage capacitor is substantially identical to the electrical characteristic of the second storage capacitor in the same external environment.

For example, the first control signal and the second control signal are the same to turn on or turn off the first switching element 11 and the second switching element 21 at the same time. For example, the control terminal G1 of the first switching element 11 and the control terminal G2 of the second switching element 21 may be electrically connected to the same gate driver to receive the same control signal. However, the embodiment of the present disclosure is not limited thereto. For example, the control terminal G1 of the first switching element 11 and the control terminal G2 of the second switching element 21 may also be electrically connected to different gate drivers, respectively, as long as it is ensured that the first control signal is the same as the second control signal.

For example, the first terminal Si of the first switching element 11 is a signal input terminal, and the second terminal D1 of the first switching element 11 is a signal output terminal; the first terminal S2 of the second switching element 21 is a signal input terminal, and the second terminal D2 of the second switching element 21 is a signal output terminal. For example, the signal input terminal can be the source electrode of the transistor for inputting the signal; the signal output terminal can be the drain electrode of the transistor for outputting the signal; the control terminal is the gate electrode of the transistor for receiving the control voltage to control the operating state of the transistor. However, considering the symmetry between the source electrode and drain electrode of the transistor, the signal input terminal can also be the drain electrode of the transistor, and the signal output terminal can be the source electrode of the transistor. For example, for an N-type transistor, the signal input terminal is a drain electrode, and the signal output terminal is a source electrode; for a P-type transistor, the signal input terminal is a source electrode, and the signal output terminal is a drain electrode.

For example, as shown in FIG. 2, the first sub-circuit 110 further comprises a third storage capacitor 13, and the second sub-circuit 120 further comprises a fourth storage capacitor 23. A first terminal of the third storage capacitor 13 is electrically connected to the control terminal of the first switching element 11, and a second terminal of the third storage capacitor 13 is configured to receive the fifth power voltage signal. A first terminal of the fourth storage capacitor 23 is electrically connected to the control terminal of the second switching element 21, and a second terminal of the fourth storage capacitor 23 is configured to receive the fifth power voltage signal. The fifth power voltage signal may be, for example, 0V. The third storage capacitor 13 is used to hold the first control signal to the scan process of a next frame so that the first switching element 11 is in a turn-on state during the entire frame period; the fourth storage capacitor 23 is used to hold the second control signal to the scan process of the next frame so that the second switching element 21 is in a turn-on state during the entire frame period.

It should be noted that in the embodiments of the present disclosure, the first sub-circuit 110 and the second sub-circuit 120 may further respectively comprise a detection transistor, a pass transistor, a reset transistor, and the like according to actual needs.

For example, as shown in FIG. 2, the photoelectric detection circuit further comprises a difference circuit 30. The difference circuit 30 is configured to perform a difference process on the first output signal Q1 output by the first sub-circuit 110 and the second output signal Q2 output by the second sub-circuit 120.

For example, the difference circuit 30 comprises a first signal input terminal and a second signal input terminal. For example, the first signal input terminal is used for connecting to the first terminal of the first storage capacitor 12, and the second signal input terminal is used for connecting to the first terminal of the second storage capacitor 22, so the first signal input terminal can receive the first output signal Q1, and the second signal input terminal can receive the second output signal Q2.

It should be noted that a switch element may be provided between the first signal input terminal and the first terminal of the first storage capacitor 12 so as to control the difference circuit 30 to read the first output signal Q1 stored by the first storage capacitor 12. Correspondingly, a switching element may also be provided between the second signal input terminal and the first terminal of the second storage capacitor 22, for controlling the difference circuit 30 to read the second output signal Q2 stored by the second storage capacitor 22.

For example, the first output signal Q1 may comprise a first sensed electrical signal generated and output by the first photoelectric sensing element 10 and an environmental noise signal generated by other electronic components in the first sub-circuit 110; the second output signal Q2 may comprise a second sensed electrical signal generated and output by the second photoelectric sensing element 20 and an environmental noise signal generated by other electronic components in the second sub-circuit 120.

For example, under light irradiation, the first photoelectric sensing element 10 receives incident light and generates optical-generated charge, and the second photoelectric sensing element 20 also receives incident light and generates optical-generated charge.

For example, the first output signal Q1 can be expressed as follows:

$$Q_1 = f_{11} + f_{12}$$

where $f_{11}$ represents the amount of the charges generated by the first photoelectric sensing element 10, that is, $f_{11}$ is the first sensed electrical signal; $f_{12}$ represents the amount of the charges generated by the first sub-circuit 110 due to the change of the external environment, which represents the amount of the environmental noise charges generated by the electronic components in the first sub-circuit 110 due to the change of the external environment.

For example, the second output signal Q2 can be expressed as follows:

$$Q_2 = -f_{21} + f_{22}$$

where $f_{21}$ represents the amount of the charges generated by the second photoelectric sensing element 20, that is, $f_{21}$ is the second sensed electrical signal; $f_{22}$ represents the amount of the charges generated by the second sub-circuit 120 due to the change of the external environment, which represents the amount of the environmental noise charges generated by the electronic components in the second sub-circuit 120 due to the change of the external environment.

It should be noted that $f_{11}$ only represents the absolute value of the amplitude value of the first sensed electrical signal and does not include the sign; $f_{21}$ only represents the absolute value of the amplitude value of the second sensed electrical signal and does not include the sign.

In the same external environment, the electrical characteristics of the electronic components of the first sub-circuit 110 and the second sub-circuit 120 are substantially the same, so $f_{12} = f_{22}$, that is, the environmental noise charges of the first sub-circuit 110 is equal to the environmental noise charges of the second sub-circuit 120.

The first output signal Q1 and the second output signal Q2 are input to the difference circuit 30, and undergo the difference processing. For example, the second output signal Q2 is subtracted from the first output signal Q1. The difference signal Q can be obtained:

$$Q = Q_1 - Q_2 = f_{11} + f_{21}$$

That is, the difference signal Q is the sum of the first sensed electrical signal output by the first photoelectric sensing element 10 and the second sensed electrical signal output by the second photoelectric sensing element 20.

For example, if the first photoelectric sensing element 10 and the second photoelectric sensing element 20 have the same photosensitive area and are irradiated with the same incident light, then $f_{11} = f_{21}$, that is, the absolute value of the first sensed electrical signal is equal to the absolute value of the second sensed electrical signal, and thus, the difference signal Q can be expressed as:

$$Q = Q_1 - Q_2 = 2f_{11} = 2f_{21}$$

Therefore, the photoelectric detection circuit provided by the embodiment of the present disclosure can eliminate the noise signal caused by the external environment of each of the electronic components in the circuit on the basis of not affecting the intensity of the optical signal, and improve the detection accuracy.

Figure 3A:
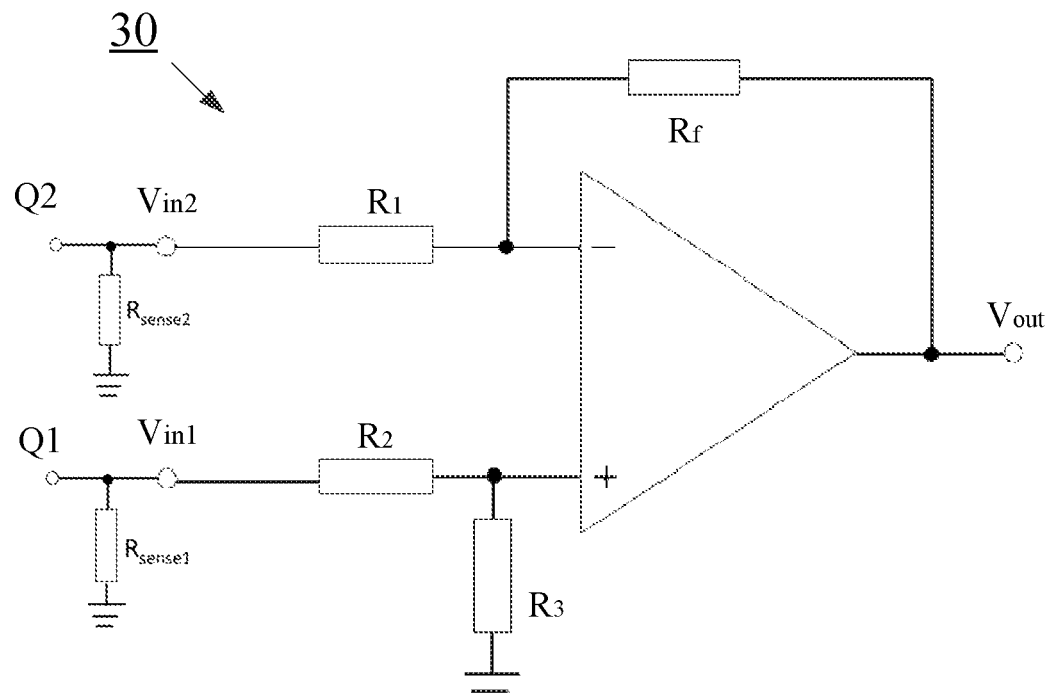
FIG. 3A is a schematic diagram of a difference circuit provided by an embodiment of the present disclosure.

For example, the difference circuit 30 can be implemented by a hardware circuit. The difference circuit 30 can be configured by elements such as transistors, resistors, capacitors, amplifiers, and the like. FIG. 3A is a schematic diagram of a difference circuit provided by an embodiment of the present disclosure.

For example, the first output signal Q1 and the second output signal Q2 are all current signals. As shown in FIG. 3A, the first output signal Q1 is converted into the first voltage signal $V_{in1}$ by the first readout amplifier, and the second output signal Q2 is converted into the second voltage signal $V_{in2}$ by the second readout amplifier, and the first readout amplifier is, for example, a resistor $R_{sense1}$, and the second readout amplifier is, for example, a resistor $R_{sense2}$. A differential voltage signal $V_{out}$ can be obtained after the first voltage signal $V_{in1}$ and the second voltage signal $V_{in2}$ pass through a circuit composed of the resistors $R_1$, $R_2$, $R_3$, $R_f$, and operational amplifiers, etc., and the $V_{out}$ can be expressed as follows:

$$V_{out} = \frac{R_f}{R_1} \cdot (V_{in1} - V_{in2})$$

When the resistance of the resistor R1 is the same as the resistance of the resistor $R_f$, the difference voltage signal $V_{out}$ is the difference between the first voltage signal $V_{in1}$ and the second voltage signal $V_{in2}$. When the resistance of the resistor $R_f$ is greater than the resistance of the resistor $R_1$, the difference circuit 30 can also amplify the electrical signal output by the photoelectric detection circuit. The difference signal Q may be the difference voltage signal $V_{out}$; or the difference voltage signal $V_{out}$ is reduced to a difference current signal, and the difference signal Q may be the difference current signal. In this way, the difference processing of subtracting the second output signal Q2 from the first output signal Q1 can be realized.

For example, a difference process of subtracting the first output signal Q1 from the second output signal Q2 can also be realized based on a similar principle.

For another example, the difference circuit 30 may also be implemented by a signal processor such as an FPGA, a DSP, a CMU, and the like. The difference circuit 30 may comprise, for example, a processor and a memory, and the processor executes computer program instructions stored in the memory to implement the function of performing the difference process on the first output signal Q1 and the second output signal Q2.

For example, as shown in FIG. 2, the photoelectric detection circuit further comprises an amplification circuit 31. The difference circuit 30 is also configured to output the difference signal Q, and the amplification circuit 31 receives the difference signal Q and performs an amplification process on the difference signal Q.

For example, the signal input terminal of the amplification circuit 31 is electrically connected the signal output terminal of the difference circuit 30.

For example, the amplification circuit 31 may be a charge amplification circuit, a voltage amplification circuit, or the like. When the difference signal Q is a charge signal or a current signal, the amplification circuit 31 can convert the difference signal Q into an amplified voltage signal, and the voltage signal is proportional to the difference signal Q; when the difference signal Q is a voltage signal, the amplification circuit 31 can directly amplify the voltage signal.

Figure 3B:
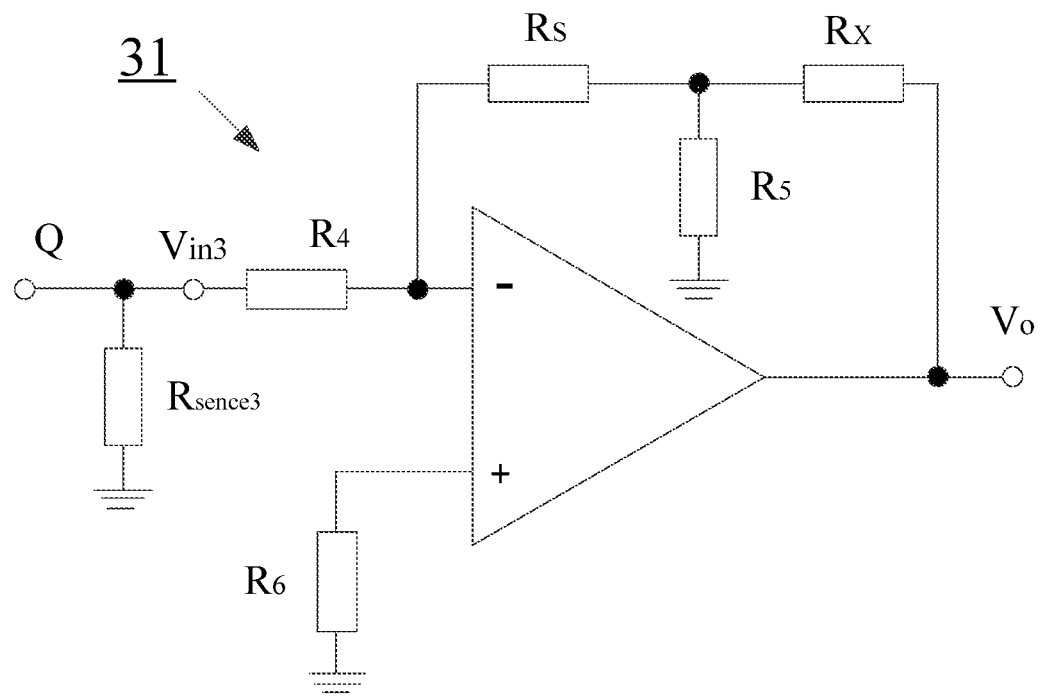
FIG. 3B is a schematic diagram of an amplification circuit provided by an embodiment of the present disclosure.

For example, the amplification circuit 31 can also be implemented by a hardware circuit. The amplification circuit 31 can be configured by elements such as transistors, resistors, capacitors, amplifiers, and the like, for example. FIG. 3B shows a schematic diagram of an amplification circuit provided by an embodiment of the present disclosure.

For example, the difference signal Q may be a current signal. As shown in FIG. 3B, the difference signal Q is converted into a third voltage signal $V_{in3}$ by a third readout amplifier, such as a resistor $R_{sense3}$. An amplified voltage signal $V_o$ is obtained after the third voltage signal $V_{in3}$ passes through a circuit composed of resistors $R_4$, $R_5$, $R_6$, $R_x$, $R_s$, an operational amplifier, and the like. The $V_o$ can be expressed as follows:

$$V_o = -\frac{R_s}{R_1} \cdot \left(1 + \frac{R_x}{R_2}\right) \cdot V_{in3}$$

The resistance of each of the resistors of the amplification circuit 31 directly determines the amplification gain of the amplification circuit 31. By adjusting the resistances of the resistors $R_4$, $R_5$, $R_6$, $R_x$, $R_s$, the magnitude of the output amplified voltage signal $V_o$ can be adjusted.

For example, the difference signal Q may also be a voltage signal. In this case, the amplification circuit 31 may not need the third readout amplifier.

For example, the amplification circuit 31 may be a single-stage coupling amplification circuit or a multi-stage coupling amplification circuit. The amplification circuit 31 can linearly or nonlinearly transform the input signal. The linear transformation may comprise, for example, a linear function transformation or the like, and the nonlinear transformation may comprise, for example, an exponential transformation or a quadratic function transformation or the like. This embodiment is not limited in this aspect.

For example, a specific example of the amplification circuit 31 may be an electronic amplifier. The electronic amplifier may comprise, for example, an operational amplifier or the like.

For example, the first photoelectric sensing element 10 and the second photoelectric sensing element 20 have a same response wavelength range, that is, the detection wavelength range of the first photoelectric sensing element 10 is the same as the detection wavelength range of the second photoelectric sensing element 20. For example, the first photoelectric sensing element 10 can be a photodiode. For photodiodes, different preparation materials have different response wavelength ranges. For example, if the material of the photodiode is silicon (Si), the first photoelectric sensing element 10 has a response wavelength range of 190 nm to 1100 nm; if the material of the photodiode is indium gallium arsenide (InGaAs), the response wavelength range of the first photoelectric sensing element 10 is 190 nm to 1100 nm.

For example, as shown in FIG. 2, the photoelectric detection circuit may also comprise a wavelength conversion element 32. The wavelength conversion element 32 corresponding to the first photoelectric sensing element 10 is configured to convert the incident light into the light of the wavelength in the response wavelength range of the first photoelectric sensing element 10. The wavelength conversion element 32 corresponding to the second photoelectric sensing element 20 is also configured to convert the incident light into the light of the wavelength in the response wavelength range of the second photoelectric sensing element 20. The incident light may be high-frequency rays, and the high-frequency rays may comprise short-wave rays such as ultraviolet rays, X-rays, gamma rays, and the like, for example.

For example, the wavelength conversion element may comprise a scintillator. The scintillator is used to absorb high-frequency rays and convert the absorbed high-frequency rays into visible light. Scintillators can be classified into, for example, inorganic scintillators and organic scintillators. The inorganic scintillators are mainly solid inorganic crystals; the inorganic scintillators are mainly crystals formed of inorganic scintillators doped with metal or rare earth impurities. For example, the material of the scintillator may comprise gadolinium oxysulfide ($Gd_2O_2S$), cesium iodide ($CsI_2$), sodium iodide (NaI), cadmium tungstate ($CdWO_4$), bismuth germanate ($Bi_4Ge_3O1_2$), amorphous selenium (a-Se), and the like.

It should be noted that the structure and electrical characteristic of the second photoelectric sensing element 20 may be substantially identical to the structure and electrical characteristic of the first photoelectric sensing element 10. Therefore, in the embodiments of the present disclosure, the related description of the structure and the electrical characteristic of the first photoelectric sensing element 10 is also applicable to the second photoelectric sensing element 20 in the case of no contradiction, and the repetition is no longer described again.

Figure 4A:
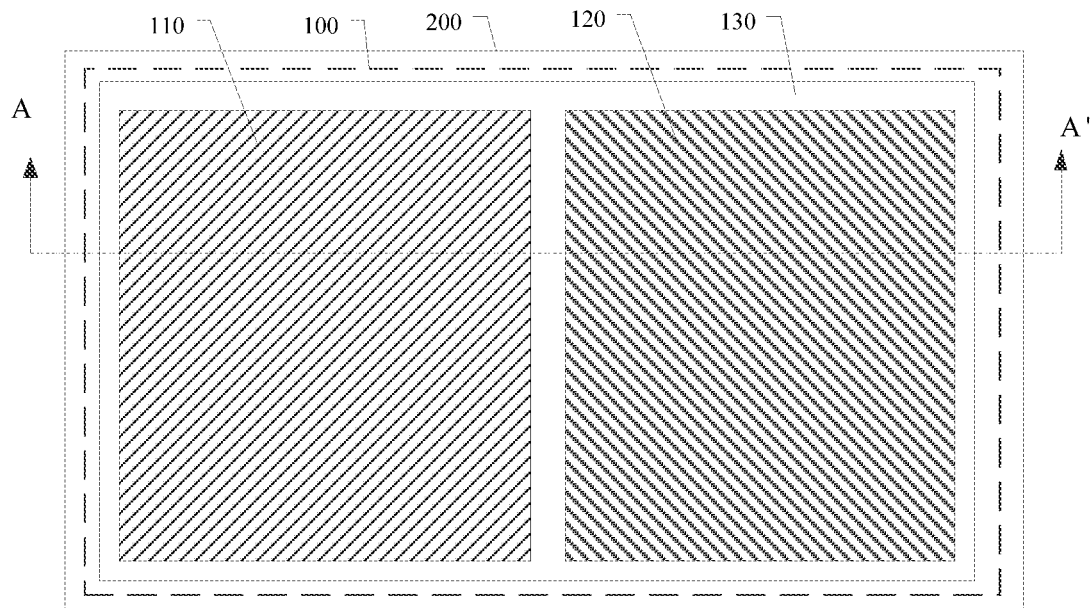
FIG. 4A is a schematic plan diagram of a photoelectric detector provided by an embodiment of the present disclosure.
Figure 4B:
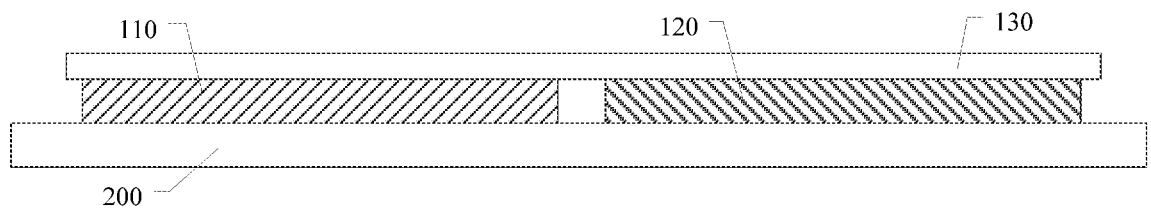
FIG. 4B is a schematic cross-sectional diagram of the photoelectric detector taken along line A-A' of FIG. 4A.
Figure 5A:
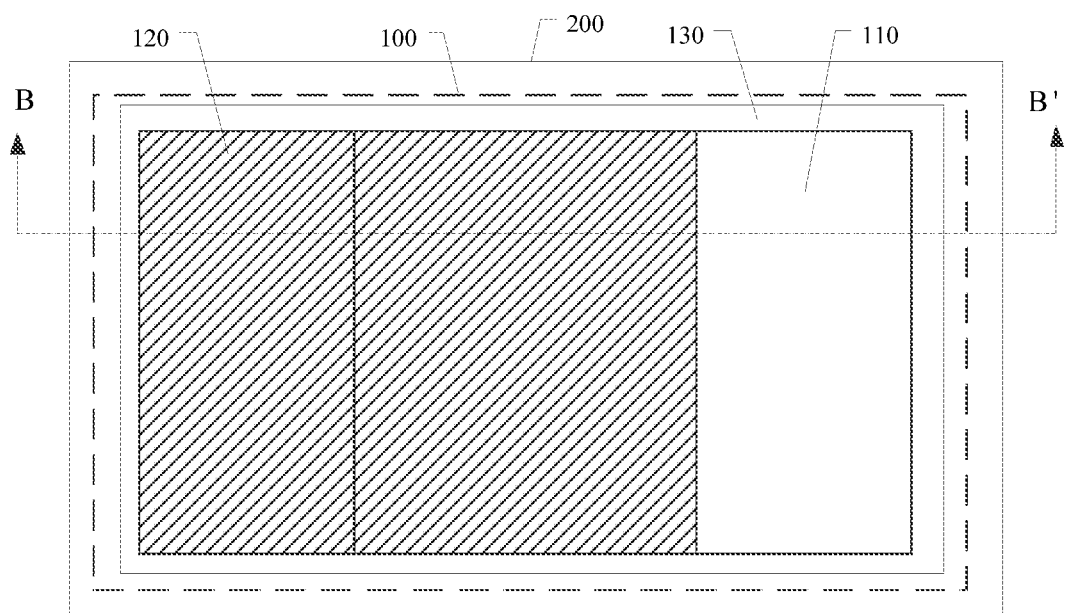
FIG. 5A is a schematic plan diagram of another photoelectric detector provided by an embodiment of the present disclosure.
Figure 5B:
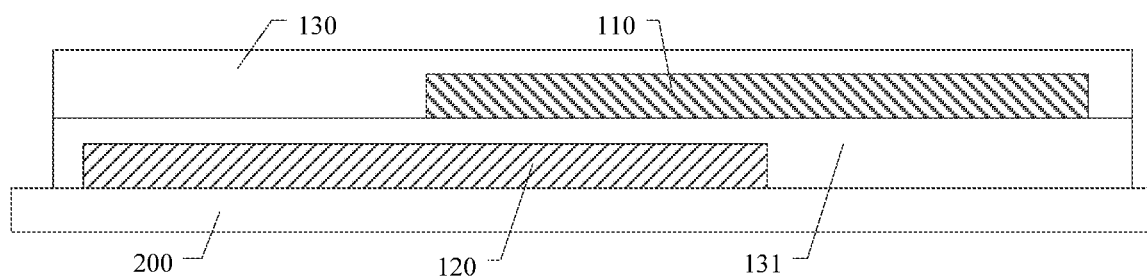
FIG. 5B is a schematic cross-sectional diagram of the photoelectric detector taken along line B-B' of FIG. 5A.

An embodiment of the present disclosure provides a photoelectric detector comprising any one of the photoelectric detection circuits described above. FIG. 4A is a schematic plan diagram of a photoelectric detector provided by an embodiment of the present disclosure; FIG. 4B is a schematic cross-sectional diagram of the photoelectric detector taken along line A-A' of FIG. 4A; FIG. 5A is a schematic plan diagram of another photoelectric detector provided by an embodiment of the present disclosure; FIG. 5B is a schematic cross-sectional diagram of the photoelectric detector taken along line B-B' of FIG. 5A.

For example, as shown in FIG. 4A, the photoelectric detector comprises a base substrate 200 and at least one of the photoelectric detection circuits 100 described in any one of the above embodiments provided on the base substrate 200. The photoelectric detection circuit 100 comprises a first sub-circuit 110 and a second sub-circuit 120. The first sub-circuit 110 comprises the first photoelectric sensing element, and the second sub-circuit 120 comprises the second photoelectric sensing element.

For example, as shown in FIGS. 4A and 4B, in one example, an orthographic projection of the first sub-circuit 110 on the base substrate 200 may not substantially overlap with an orthographic projection of the second sub-circuit 120 on the base substrate 200, so each of the electronic components of the first sub-circuit 110 and each of the corresponding electronic components of the second sub-circuit 120 can be simultaneously formed by using the same manufacturing process. Therefore, the photoelectric detection circuit 100 provided in this example can simplify the manufacturing process and improve the yield of the photoelectric detector.

For example, in a direction perpendicular to the base substrate 200, the first sub-circuit 110 does not overlap with the second sub-circuit 120. For example, the first photoelectric sensing element does not overlap with the second photoelectric sensing element at all.

For example, the photoelectric detector further comprises a passivation layer 130. The passivation layer 130 may be on the first sub-circuit 110 and the second sub-circuit 120 to protect the first sub-circuit 110 and the second sub-circuit 120. The passivation layer 130 can isolate the photoelectric detection circuit 100 from the outside, thereby reducing the external water and oxygen and the like which permeate into the electronic components of the photoelectric detection circuit 100, and effectively improving the performance and stability of the electronic components of the photoelectric detection circuit 100, and prolonging the service life of the photoelectric detection circuit 100.

For example, the material of passivation layer 130 can be silicon nitride (SiNx), silicon oxide (SiOx), silicon oxynitride (SiNxOy) or other suitable materials.

For example, in one example, an orthographic projection of the first sub-circuit 110 on the base substrate 200 can overlap with at least part of an orthographic projection of the second sub-circuit 120 on the base substrate 200. In the photoelectric detection circuit 100 provided in this example, the first photoelectric sensing element and the second photoelectric sensing element each can have a large light sensing area, which can receive more incident light, so the output signal of the photoelectric detection circuit 100 can be increased, and the signal-to-noise ratio can be improved.

For example, the first sub-circuit 110 may further comprise the first switching element and the first storage capacitor, and the second sub-circuit 120 may further comprise the second switching element and the second storage capacitor. As shown in FIG. 5A and FIG. 5B, the first sub-circuit 110 may be above the second sub-circuit 120, and an orthogonal projection of the first switching element on the base substrate 200 overlaps with an orthogonal projection of the second switching element on the base substrate 200, and/or an orthogonal projection of the first storage capacitor on the base substrate 200 overlaps with an orthogonal projection of the second storage capacitor on the base substrate 200. For example, in the direction perpendicular to the base substrate 200, the first photoelectric sensing element may overlap with the second photoelectric sensing element or both may be shift from each other, and the second photoelectric sensing element may receive the incident light signal.

For example, the photoelectric detection circuit 100 may also comprise an insulation layer 131. The insulation layer 131 can be provided between the first sub-circuit 110 and the second sub-circuit 120 to prevent a short circuit between the electronic components of the first sub-circuit 110 and the electronic components of the second-sub circuit 120.

For example, the material of the insulation layer 131 is a transparent insulating material, so as to ensure that light can be incident on the second photoelectric sensing element. The transparent insulating material may comprise, for example, a suitable material such as silicon nitride ($SiN_x$), silicon oxide ($SiO_x$), silicon oxynitride ($SiN_xO_y$), and the like.

For example, as shown in FIG. 5A and FIG. 5B, the passivation layer 130 may be on the first sub-circuit 110 to protect the first sub-circuit 110.

For example, as shown in FIG. 2, the photoelectric detector may further comprise a first power terminal V1 and a second power terminal V2. The first set of power signals comprises a first power voltage signal, and the second set of power signals comprises a second power voltage signal. The first power terminal V1 is electrically connected to the first terminal N11 of the first photoelectric sensing element 10, and is configured to output the first power voltage signal to the first terminal N11 of the first photoelectric sensing element 10, and the second power terminal V2 is electrically connected to the first terminal N21 of the second photoelectric sensing element 20, and is configured to output the second power voltage signal to the first terminal N21 of the second photoelectric sensing element 20.

For example, the photoelectric detector may also comprise a first power line and a second power line (not shown in the figure). The first power line is used for transmitting the first power voltage signal for the first power terminal V1, and the second power line is used for transmitting the second power voltage signal for the second power terminal V2.

For example, as shown in FIG. 2, the photoelectric detector further comprises a third power terminal V3 and a fourth power terminal V4. The first set of power signals further comprises a third power voltage signal, and the second set of power signals further comprises a fourth power voltage signal. The third power terminal V3 is electrically connected to the second terminal of the first storage capacitor 12, and is configured to output the third power voltage signal to the second terminal of the first storage capacitor 12; and the fourth power terminal V4 is electrically connected to the second terminal of the second storage capacitor 22, and is configured to output the fourth power voltage signal to the second terminal of the second storage capacitor 22.

For example, the photoelectric detector may also comprise a third power line and a fourth power line (not shown in the figure). The third power line is used for transmitting the third power voltage signal for the third power terminal V3, and the fourth power line is used for transmitting the fourth power voltage signal for the fourth power terminal V4.

For example, the polarity of the first terminal N11 of the first photoelectric sensing element 10 is opposite to the polarity of the first terminal N21 of the second photoelectric sensing element 20, and the polarity of the second terminal N12 of the first photoelectric sensing element 10 is opposite to the polarity of the second terminal N22 of the second photoelectric sensing element 20. In one example, the first terminal N11 of the first photoelectric sensing element 10 is a positive terminal, and the second terminal N12 of the first photoelectric sensing element 10 is a negative terminal; and the first terminal N21 of the second photoelectric sensing element 20 is a negative terminal, and the second terminal N22 of the second photoelectric sensing element 20 is a positive terminal. For example, the first power voltage signal may be a positive voltage signal, the second power voltage signal may be a negative voltage signal, the third power voltage signal may be the same as the fourth power voltage signal, so that the first power terminal V1 can electrically connect the positive electrode of a power source to output a positive voltage signal, and the second power terminal V2 can electrically connect the negative electrode of the power source to output a negative voltage signal, the third power terminal V3 and the fourth power terminal V4 may both be grounded, so the third power voltage signal and the fourth power voltage signal may both be 0V.

For example, the difference obtained by subtracting the third power voltage signal from the first power voltage signal is the first voltage difference, and the difference obtained by subtracting the fourth power voltage signal from the second power voltage signal is the second voltage difference, and the sign of the first voltage difference is opposite to the sign of the second voltage difference, and the amplitude value of the first voltage difference is substantially identical to the amplitude value of the second voltage difference.

It should be noted that the connection manner of the first sub-circuit 110 with the first power terminal V1 and the third power terminal V3 and the connection manner of the second sub-circuit 120 with the second power terminal V2 and the fourth power terminal V4 can be set according to the actual needs; and the output voltages of the first power terminal V1, the second power terminal V2, the third power terminal V3, and the fourth power terminal V4 may also be set according to actual needs as long as it is ensured that the sign of the first voltage difference is opposite to the sign of the second voltage difference, and the amplitude value of the first voltage difference is substantially identical to the amplitude value of the second voltage difference. This embodiment is not specifically limited in this aspect.

It should be noted that, the detailed description of the first power voltage signal, the second power voltage signal, the third power voltage signal, and the fourth power voltage signal, can refer to the related description in the foregoing embodiment of the photoelectric detection circuit, and details are not described here again.

For example, as shown in FIG. 2, the photoelectric detector may further comprise a fifth power terminal V5. The fifth power terminal V5 may be electrically connected to the second terminal of the third storage capacitor 13 and the second terminal of the fourth storage capacitor 23, respectively, and is configured to output the fifth power voltage signal to the second terminal of the third storage capacitor 13 and the second terminal of the fourth storage capacitor 23. The fifth power terminal V5 may also be grounded, for example.

For example, the base substrate 200 may be a glass substrate, a quartz substrate, a ceramic substrate, a plastic substrate, a silicone substrate, and the like. For another example, the base substrate 200 may also be a panel formed with functional components, and other circuits or elements may be formed on the base substrate, for example.

For example, the photoelectric detector may also comprise a gate driving circuit. The gate driving circuit is used to provide a driving signal for the photoelectric detection circuit 100 to control the detected electrical signal that is output by the photoelectric detection circuit 100. For example, the gate driving circuit may output a control signal to control the turn-on or turn-off of the first switching element and the second switching element of the photoelectric detection circuit 100.

Figure 6:
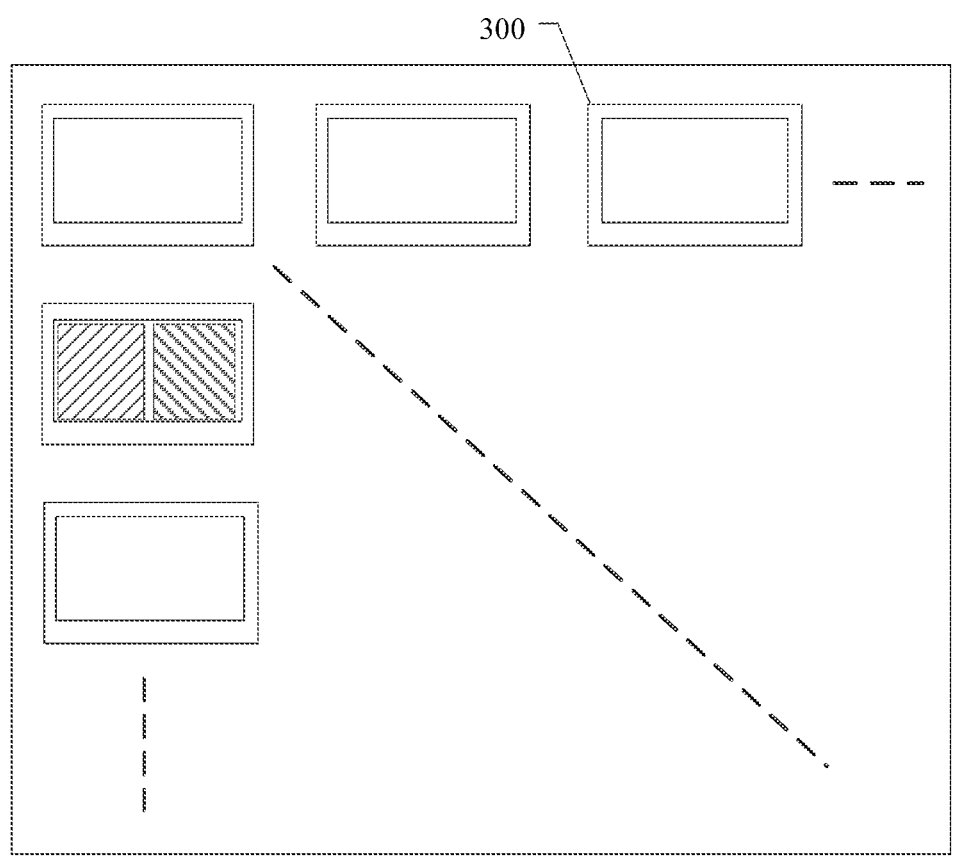
FIG. 6 is a schematic plan diagram of a photoelectric detection device provided by an embodiment of the present disclosure.

The embodiment of the present disclosure provides a photoelectric detection device. FIG. 6 shows a schematic plan diagram of a photoelectric detection device provided by an embodiment of the present disclosure.

For example, the photoelectric detection device comprises the photoelectric detector described in any of the above embodiments. The photoelectric detector may be, for example, a visible light detector, an X-ray detector, an infrared light detector, and the like. As shown in FIG. 6, a plurality of detection units 300 in an array may be provided on the base substrate of the photoelectric detector, and each of the detection units 300 comprises any one of the above mentioned photoelectric detection circuits.

For this disclosure, the following points need to be explained:

(1) The drawings of the embodiments of the present disclosure only relate to the structures involved in the embodiments of the present disclosure, and other structures may refer to the normal designs.

(2) In the case of no conflict, the embodiments of the present disclosure and the features in the embodiments can be combined with each other to obtain a new embodiment.

What are described above is related to the illustrative embodiments of the disclosure only and not limitative to the scope of the disclosure, the scopes of the disclosure are defined by the accompanying claims.

What is claimed is:

1. A photoelectric detection circuit, comprising a first sub-circuit and a second sub-circuit,
wherein the first sub-circuit comprises a first photoelectric sensing element, and the second sub-circuit comprises a second photoelectric sensing element, and an electrical characteristic of the first photoelectric sensing element is substantially identical to an electrical characteristic of the second photoelectric sensing element, and the first sub-circuit is configured to receive a first set of power signals to enable the first photoelectric sensing element to output a first sensed electrical signal, and the second sub-circuit is configured to receive a second set of power signals to enable the second photoelectric sensing element to output a second sensed electrical signal,
a polarity of the first sensed electrical signal is opposite to a polarity of the second sensed electrical signal, and an amplitude value of the first sensed electrical signal is substantially identical to an amplitude value of the second sensed electrical signal;
the first set of power signals comprises a first power voltage signal, and the second set of power signals comprises a second power voltage signal, and a first terminal of the first photoelectric sensing element is configured to receive the first power voltage signal, and a first terminal of the second photoelectric sensing element is configured to receive the second power voltage signal, a polarity of the first terminal of the first photoelectric sensing element is opposite to a polarity of the first terminal of the second photoelectric sensing element;

the first sub-circuit further comprises a first switching element and a first storage capacitor, and the first switching element is configured to control the first photoelectric sensing element to output the first sensed electrical signal, and the first storage capacitor is configured to store the first sensed electrical signal, the second sub-circuit further comprises a second switching element and a second storage capacitor, and the second switching element is configured to control the second photoelectric sensing element to output the second sensed electrical signal, and the second storage capacitor is configured to store the second sensed electrical signal, the first set of power signals further comprises a third power voltage signal, and the second set of power signals further comprises a fourth power voltage signal, and a second terminal of the first photoelectric sensing element is electrically connected to a first terminal of the first switching element, and a control terminal of the first switching element is configured to receive a control signal, and a second terminal of the first switching element is electrically connected to a first terminal of the first storage capacitor, and a second terminal of the first storage capacitor is configured to receive the third power voltage signal;

a second terminal of the second photoelectric sensing element is electrically connected to a first terminal of the second switching element, and a control terminal of the second switching element is configured to receive the control signal, and a second terminal of the second switch element is electrically connected to a first terminal of the second storage capacitor, and a second terminal of the second storage capacitor is configured to receive the fourth power voltage signal; and a polarity of the second terminal of the first photoelectric sensing element is opposite to a polarity of the second terminal of the second photoelectric sensing element.

2. The photoelectric detection circuit according to claim 1, wherein a difference obtained by subtracting the third power voltage signal from the first power voltage signal is a first voltage difference, and a difference obtained by subtracting the fourth power voltage signal from the second power voltage signal is a second voltage difference, and a sign of the first voltage difference is opposite to a sign of the second voltage difference, and an amplitude value of the first voltage difference is substantially identical to an amplitude value of the second voltage difference.

3. The photoelectric detection circuit according to claim 1, wherein the first terminal of the first photoelectric sensing element is a positive terminal, and the second terminal of the first photoelectric sensing element is a negative terminal, and the first terminal of the second photoelectric sensing element is a negative terminal, and the second terminal of the second photoelectric sensing element is a positive terminal.

4. The photoelectric detection circuit according to claim 1, wherein an electrical characteristic of the first switching element is substantially identical to an electrical characteristic of the second switching element, and an electrical characteristic of the first storage capacitor is substantially identical to an electrical characteristic of the second storage capacitor.

5. The photoelectric detection circuit according to claim 1, further comprising a difference circuit, wherein the difference circuit is configured to perform a difference processing on a first output signal output by the first sub-circuit and a second output signal output by the second sub-circuit.

6. The photoelectric detection circuit of claim 5, further comprising an amplification circuit, wherein the difference circuit is further configured to output a difference signal, and the amplification circuit receives the difference signal and performs an amplification process on the difference signal.

7. The photoelectric detection circuit according to claim 1, wherein the first photoelectric sensing element comprises a first photodiode and the second photoelectric sensing element comprises a second photodiode.

8. The photoelectric detection circuit according to claim 1, further comprising a wavelength conversion element, wherein the first photoelectric sensing element and the second photoelectric sensing element have a same response wavelength range, and the wavelength conversion element is configured to convert incident light into light in the response wavelength range.

9. A photoelectric detector, comprising at least one of the photoelectric detection circuit according to claim 1.

10. The photoelectric detector according to claim 9, further comprising a base substrate, wherein the first sub-circuit and the second sub-circuit are provided on the base substrate, and an orthographic projection of the first sub-circuit on the base substrate does not substantially overlap with an orthographic projection of the second sub-circuit on the base substrate.

11. The photoelectric detector according to claim 9, further comprising a base substrate, wherein the first sub-circuit and the second sub-circuit are provided on the base substrate, and an orthographic projection of the first sub-circuit on the base substrate overlaps with at least part of an orthographic projection of the second sub-circuit on the base substrate.

12. The photoelectric detector of claim 11, wherein the first sub- circuit further comprises a first switching element and a first storage capacitor, and the second sub-circuit further comprises a second switching element and a second storage capacitor;

an orthogonal projection of the first switching element on the base substrate overlaps with an orthogonal projection of the second switching element on the base substrate, and/or, an orthogonal projection of the first storage capacitor on the base substrate overlaps with an orthogonal projection of the second storage capacitor on the base substrate.

13. The photoelectric detector according to claim 9, further comprising a first power terminal and a second power terminal, wherein the first set of power signals comprises a first power voltage signal, and the second set of power signals comprises a second power voltage signal, and the first power terminal is configured to output the first power voltage signal to a first terminal of the first photoelectric sensing element, and the second power terminal is configured to output the second power voltage signal to a first terminal of the second photoelectric sensing element, and a polarity of the first terminal of the first photoelectric sensing element is opposite to a polarity of the first terminal of the second photoelectric sensing element.

14. The photoelectric detector of claim 13, further comprising a third power terminal and a fourth power terminal, wherein the first sub-circuit further comprises a first switching element and a first storage capacitor, and the second sub-circuit further comprises a second switching element and a second storage capacitor, and the third power terminal is configured to output the third power voltage signal, and the fourth power terminal is configured to output the fourth power voltage signal, and a second terminal of the first photoelectric sensing element is electrically connected to a first terminal of the first switching element, and a control terminal of the first switching element is configured to receive a control signal, and a second terminal of the first switch element is electrically connected to a first terminal of the first storage capacitor, and a second terminal of the first storage capacitor is configured to receive the third power voltage signal; and a second terminal of the second photoelectric sensing element is electrically connected to a first terminal of the second switching element, and a control terminal of the second switching element is configured to receive the control signal, and a second terminal of the second switch element is electrically connected to a first terminal of the second storage capacitor, and a second terminal of the second storage capacitor is configured to receive the fourth power voltage signal, and a polarity of the second terminal of the first photoelectric sensing element is opposite to a polarity of the second terminal of the second photoelectric sensing element.

15. The photoelectric detector of claim 14, wherein a difference obtained by subtracting the third power voltage signal from the first power voltage signal is a first voltage difference, and a difference obtained by subtracting the fourth power voltage signal from the second power voltage signal is a second voltage difference, and a sign of the first voltage difference is opposite to a sign of the second voltage difference, and an amplitude value of the first voltage difference is substantially identical to an amplitude value of the second voltage difference.

16. The photoelectric detector according to claim 14, wherein the first terminal of the first photoelectric sensing element is a positive terminal, and the second terminal of the first photoelectric sensing element is a negative terminal, and the first terminal of the second photoelectric sensing element is a negative terminal, and the second terminal of the second photoelectric sensing element is a positive terminal.

17. The photoelectric detector according to claim 9, further comprising a passivation layer, wherein the passivation layer is on the first sub-circuit and the second sub-circuit.

* * * * *